United States Patent
Post

(10) Patent No.: US 10,804,819 B2
(45) Date of Patent: *Oct. 13, 2020

(54) PULSED START-UP SYSTEM FOR ELECTROSTATIC GENERATORS

(71) Applicant: Lawrence Livermore National Security, LLC, Livermore, CA (US)

(72) Inventor: Richard F. Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 16/163,366

(22) Filed: Oct. 17, 2018

(65) Prior Publication Data

US 2019/0052193 A1    Feb. 14, 2019

Related U.S. Application Data

(63) Continuation of application No. 15/056,155, filed on Feb. 29, 2016, now Pat. No. 10,122,301.

(60) Provisional application No. 62/207,323, filed on Aug. 19, 2015.

(51) Int. Cl.
*H02N 1/08* (2006.01)
*H02N 1/06* (2006.01)
*H02N 1/00* (2006.01)

(52) U.S. Cl.
CPC ..................... *H02N 1/08* (2013.01)

(58) Field of Classification Search
CPC .. H02N 1/08; H02N 1/06; H02N 1/00; H02N 1/002

See application file for complete search history.

(56) References Cited

U.S. PATENT DOCUMENTS 2,840,729 A     6/1958  Kreuthemeir
3,509,395 A  *  4/1970  Van Leer ............... G10H 3/08
                                                310/168

(Continued)

FOREIGN PATENT DOCUMENTS

JP    2015-035938    2/2015
WO    2009/08512 A1  7/2009

OTHER PUBLICATIONS

EP Search Report for European Patent Office Application No. 16837515.2, corresponding to U.S. Appl. No. 15/056,155, 8 pages.

(Continued)

*Primary Examiner* — Edgardo San Martin
(74) *Attorney, Agent, or Firm* — John P. Wooldridge

(57) ABSTRACT

A new rotor start-up system is provided for application to rotating systems such as stationary or vehicular electromechanical battery systems. An embodiment of the system consists of a "locator" that includes a stationary permanent-magnet pole above which is a circular ferromagnetic (e.g., iron) strip embedded in the lower, inner edge of the flywheel rotor. The lower edge of this strip is wave-like so that the magnet can pull the rotor around to a position where the position relative to the minimum capacity between the rotor and stator electrodes is such as to launch the rotor in a chosen direction, i.e., either clock-wise or counter-clockwise. Startup from rest is then accomplished by applying a short high-voltage ac or dc pulse to the EMB capacitor.

8 Claims, 4 Drawing Sheets

(56) References Cited

U.S. PATENT DOCUMENTS

| | | | | |
|---|---|---|---|---|
| 3,553,557 | A * | 1/1971 | Korthaus et al. | G01P 3/488 |
| | | | | 318/463 |
| 3,626,228 | A * | 12/1971 | Jordan | F16D 51/00 |
| | | | | 310/168 |
| 3,688,306 | A * | 8/1972 | Oishi | G01D 5/2457 |
| | | | | 341/15 |
| 3,742,267 | A * | 6/1973 | Papst | G01P 3/488 |
| | | | | 310/67 R |
| 4,082,990 | A * | 4/1978 | Stiles | G01C 19/28 |
| | | | | 318/662 |
| 4,215,284 | A * | 7/1980 | Zentmeyer, Jr. | F02P 1/00 |
| | | | | 123/601 |
| 5,783,885 | A | 7/1998 | Post | |
| 6,756,718 | B2 * | 6/2004 | Lee | H02K 1/187 |
| | | | | 29/596 |
| 7,834,513 | B2 | 11/2010 | Post | |
| 8,779,647 | B2 | 7/2014 | Sashida | |
| 9,270,203 | B2 | 2/2016 | Post | |
| 9,270,204 | B2 | 2/2016 | Post | |
| 9,899,937 | B2 | 2/2018 | Ge | |
| 10,122,301 | B2 * | 11/2018 | Post | H02N 1/08 |
| 10,298,090 | B2 * | 5/2019 | Post | H02K 7/025 |
| 10,312,830 | B2 * | 6/2019 | Post | H02N 1/08 |
| 10,348,225 | B2 * | 7/2019 | Phan | H02K 11/215 |
| 2011/0031844 | A1 | 2/2011 | Post | |
| 2012/0043851 | A1 | 2/2012 | Sano | |
| 2014/0265722 | A1 | 9/2014 | Post | |
| 2017/0054343 | A1 | 2/2017 | Post | |
| 2017/0054385 | A1 | 2/2017 | Post | |
| 2018/0013331 | A1 | 1/2018 | Post | |

OTHER PUBLICATIONS

International Search Report and Written Opinion for PCT/US16/46242, corresponding to U.S. Appl. No. 15/056,155, 10 pages.

* cited by examiner

PULSED START-UP SYSTEM FOR ELECTROSTATIC GENERATORS

CROSS-REFERENCE TO RELATED APPLICATIONS

This application is a continuation of U.S. patent application Ser. No. 15/056,155 titled "Pulsed Start-Up System for Electrostatic Generators," filed Feb. 29, 2016, incorporated herein by reference and claims the benefit of U.S. Provisional Patent Application No. 62/207,323 titled "Pulsed Start-Up System for Electrostatic Generators," filed Aug. 19, 2015, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to electrostatic generator/motor systems, and more specifically, it relates to means for starting the rotor of such systems from rest and directing the rotation of the rotor in a desired direction.

Description of Related Art

Electrostatic generator/motors of the type described, for example, in U.S. Pat. No. 7,834,513, require means to start them up from zero speed. See also U.S. Pat. No. 9,270,203, incorporated herein by reference. When used in flywheel energy storage systems, there are situations where it is important to be able also to predetermine the direction of rotation, i.e., clockwise or counter-clockwise. An example where this latter requirement arises is when electromagnetic batteries (EMBs) are used in vehicles. In these cases, it may be important to suppress the gyroscopic forces from the flywheel rotors. This requirement can be satisfied by pairing every clockwise-rotating rotor with a counterclockwise one running at the same speed. It is therefore desirable to provide a startup system that is capable of satisfying this rotation direction requirement, in addition to providing a simple means for startup from zero speed.

In the Lawrence Livermore National Laboratory (LLNL) electrostatic generator/motor systems, the motor action function depends on a physics-based relationship between capacity value and the electrostatic forces on the elements that form the capacitor. Specifically, in a condenser made up of a periodic array of stator and rotor electrodes the capacity of which varies as a function of azimuthal position, when a potential is applied to the capacitor, the rotor will experience a force that pulls it in the direction in which the capacity value increases. This force goes to zero at the point of maximum capacity and then reverses in direction if the rotation continues. This means that in the E-S generator/motors, the motoring function occurs only over those azimuthal positions where the capacity increases, and the generator action occurs over those azimuthal regions where the capacity is decreasing. Thus in starting the generator/motor from rest, it is necessary to initially orient the capacitor so that its capacitance is increasing in the direction that one wishes it to rotate, i.e., either clockwise or counter-clockwise. The present invention provides a means for so orienting the capacitor.

SUMMARY OF THE INVENTION

This invention pertains to a new rotor start-up system for application to rotating systems such as stationary or vehicular electromechanical battery systems. An embodiment of the system consists of a "locator" that includes a stationary permanent-magnet pole above which is a circular ferromagnetic (e.g., iron) strip embedded in the lower, inner edge of the flywheel rotor. The lower edge of this strip is wave-like so that the magnet can pull the rotor around to a position where the position relative to the minimum capacity between the rotor and stator electrodes is such as to launch the rotor in a chosen direction, i.e., either clock-wise or counter-clockwise. Startup from rest is then accomplished by applying a short high-voltage ac or dc pulse to the EMB capacitor. Using the moment of inertia of the rotor and the azimuthal width of the E-S generator/motor as guides, the amplitude and duration of the startup pulse is set so that the pulse turns off as, due to the rotation velocity of the pulse, the capacitor approaches its maximum value. At that time the normal drive circuit is turned on in order to continue the growth in rotor speed until it reaches a fully charged state. The invention has a variety of uses including in flywheel energy storage systems for vehicular or stationary use or magnetically levitated rotating systems.

The invention includes a magnet-based system that insures that the resting azimuthal position of the rotor is slightly clockwise or slightly counter-clockwise from any one of the multiple azimuthal positions of minimum capacity of the rotor. The system is to be designed so as to be able to overcome the friction drag of the rotor at zero speed (e.g., utilizing mechanical "touchdown" bearings), but should take substantially less force to move it away from this position than the force that will be exerted by the pulse drive system of the invention. The invention includes an electronic system that launches the rotation of the rotor so that its electronic motor-drive system can bring it up to operating speeds.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
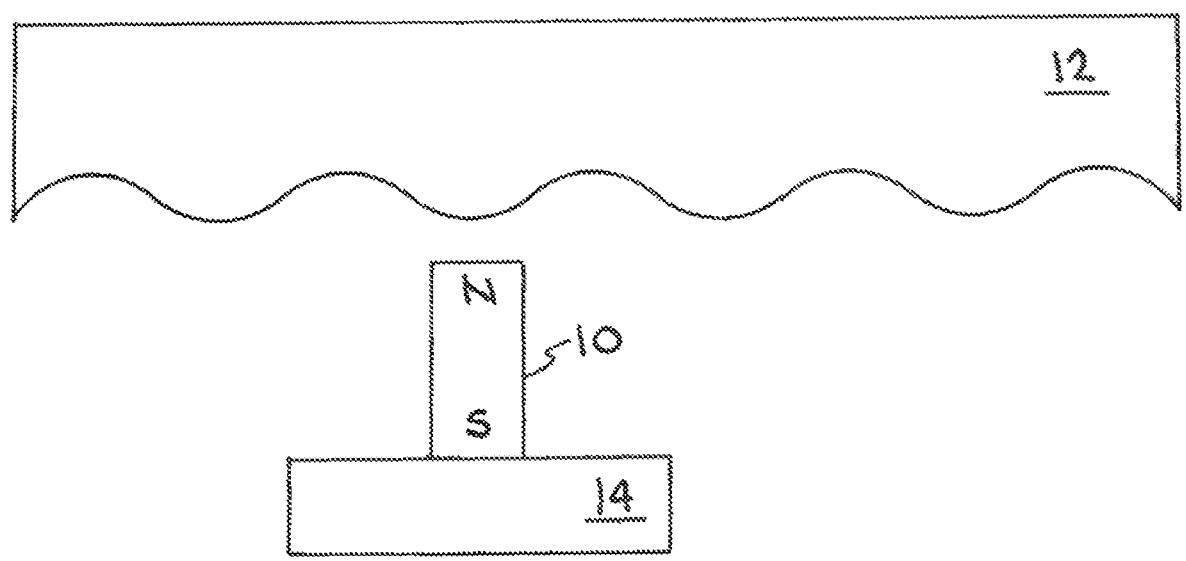
FIG. 1 is a schematic drawing of a section of the present magnetic locating system, including a permanent magnet pole embedded in the stationary structure below the rotor and a section of a thin iron ring-shaped band formed by bending an iron strip in a circle.

In an electrostatic generator/motor system having a rotor with electrodes and a stator with electrodes facing the rotor electrodes (such as in U.S. Pat. No. 7,834,513, incorporated herein by reference and as in U.S. Pat. No. 9,270,203, incorporated herein by reference), consider first an orienting system according to the present invention, which orienting system is provided for insuring that the rotor starts at the correct phase with respect to the capacity of the E-S gen/motor. FIG. 1 depicts schematically a simple design. It shows a schematic drawing of a section of magnetic locating system. A permanent magnet pole 10 is attached to (e.g., embedded in) a stationary structure 14 below the rotor. A thin iron ring-shaped band 12 is formed by bending an iron strip in a circle. This iron band is to be embedded near the inner radius of the rotor structure. The lower edge of the iron band is wave-like in shape, with shallow minima. The depth of the "wave" can be varied to achieve the desired value of locating force, with shallow waves requiring little force to displace the rotor from its azimuthal resting place as determined by magnet 10. The figure shows only a short section of the ring, located directly above the stationary locator magnet.

Figure 2:
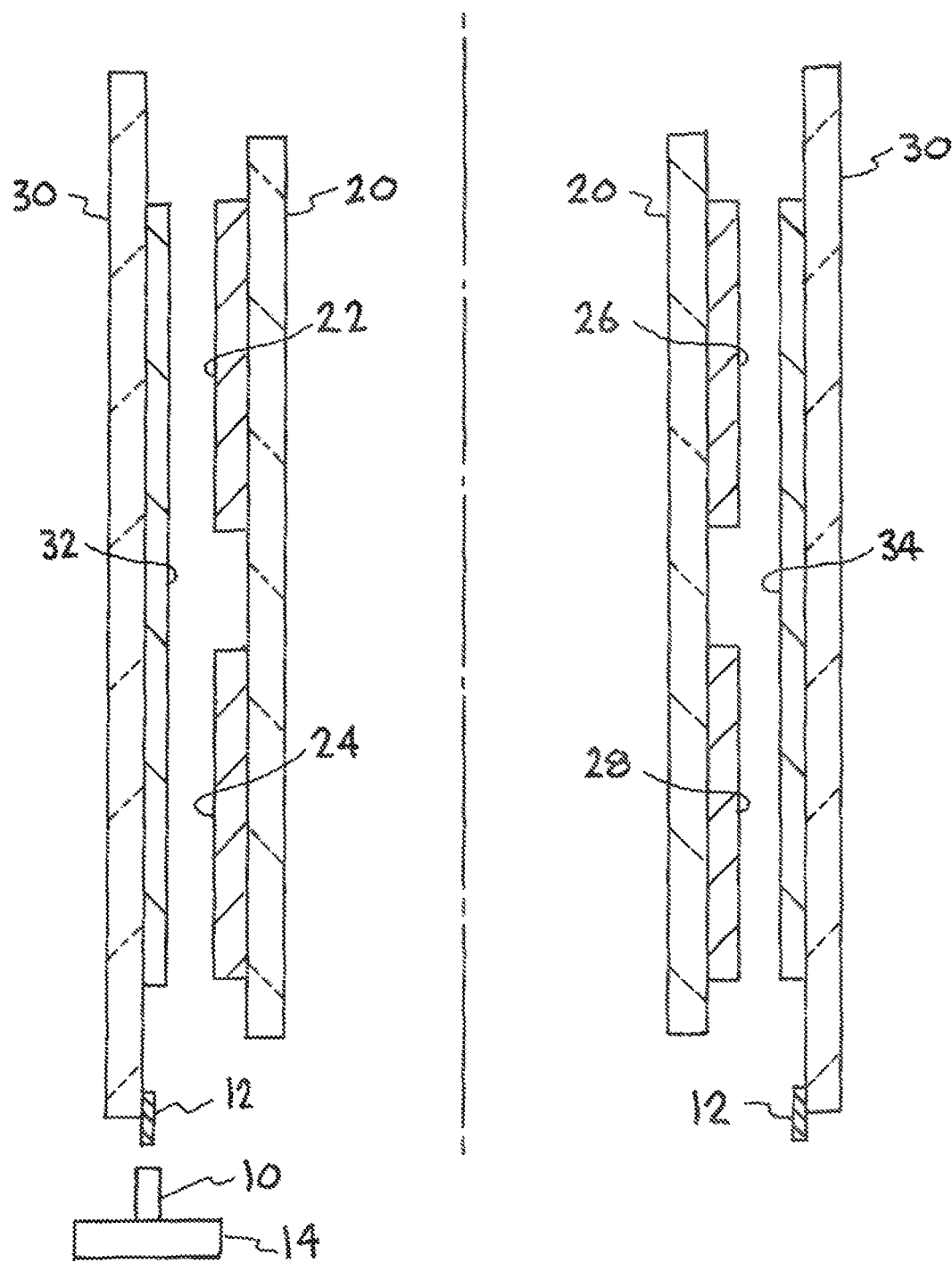
FIG. 2 is a sectional side view of the rotor and stator of an electrostatic motor/generator that includes an embodiment of the magnetic locating system of FIG. 1.

FIG. 2 is a sectional side view of an electrostatic motor/generator that includes an embodiment of the magnetic locating system of FIG. 1. The figure shows stator 20 and further shows stator electrodes 22, 24, 26 and 28. The complete stator is a hollow cylinder. Electrodes are periodically spaced around the cylindrical stator. Rotor 30 includes electrodes 32 and 34. The complete rotor is a hollow cylinder. Electrodes are periodically spaced around the cylindrical rotor. The iron ring 12 of FIG. 1 is attached to the bottom inside edge of the rotor. The iron ring is attached all the way around the bottom inside edge of the rotor. The figure also shows permanent magnet 10 attached to stationary structure 14.

The second element of the launching system is a pulse drive system that is connected to the E-S generator upper and lower stator electrodes. When this circuit is activated, it will generate an azimuthally directed force on the rotor electrodes, starting from the initial azimuthal position determined by the magnetic locating system depicted in FIG. 1. As previously described, this initial position is near the minimum point of the E-S generator capacitor, and is located so as to launch the rotation in the desired direction, i.e., either clockwise or counterclockwise. The duration of the pulse is to be slightly less than the time it will take for the rotor to move up the capacity slope to its maximum, and its amplitude will be sufficient to dislodge the rotor from the azimuthal location determined by the locator shown in FIG. 1.

Figure 3:
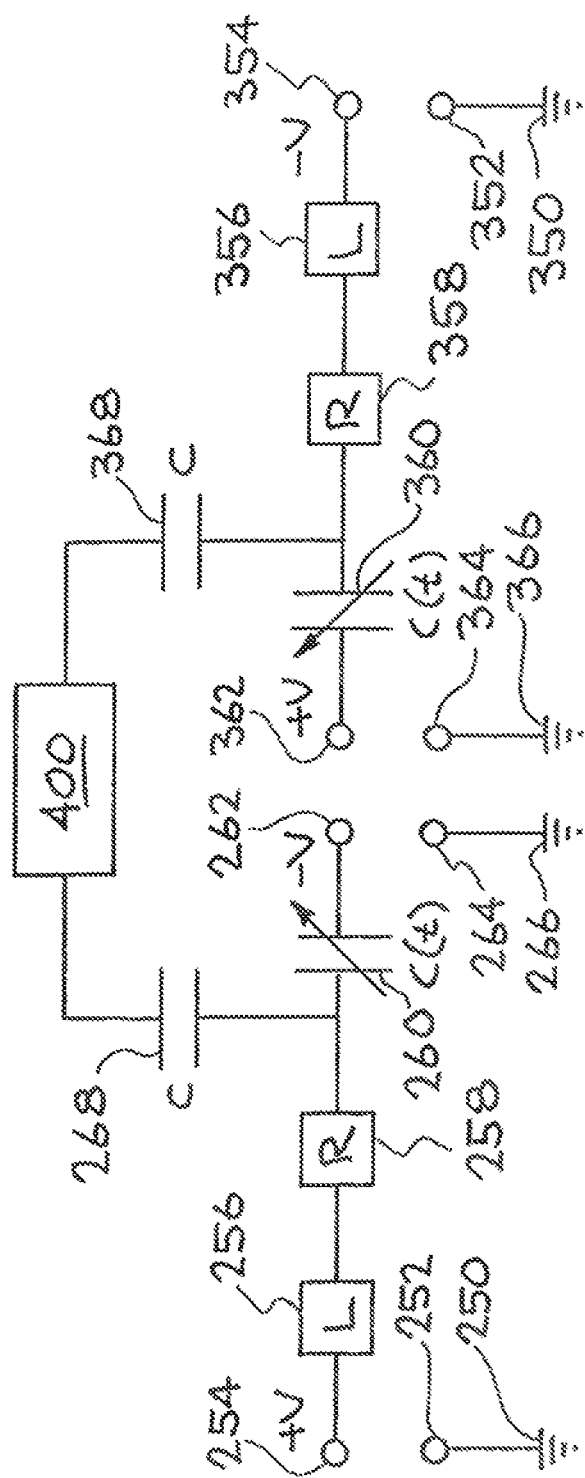
FIG. 3 depicts an exemplary dual balanced electrostatic generator circuit.

FIG. 3 depicts a dual balanced electrostatic generator that has been shown in U.S. Pat. No. 7,834,513 by computer code simulation to enhance the parametric resonance effect. This circuit is but one example of a circuit that can utilize the pulsed start-up system of the present invention. In the left portion of the circuit of FIG. 3, a negative DC power supply terminal 252 is connected to ground at 250. Positive DC power supply terminal 254 is connected to inductor 256 which is connected to resistor 258 which is connected to one side of variable capacitor 260. The other side of variable capacitor 260 is connected to a negative DC power supply terminal 262. A positive DC power supply terminal 264 is connected to ground at 266. Resistor 258 is also connected to capacitor 268 which is connected to pulse circuit 400 of the present invention. The pulse circuit may be a high voltage pulse generator. The particular configuration of the starter circuit may be as such circuits are known in the art. In one embodiment, once the rotor rotation has been started, a load can be operated between capacitors 268 and 368. In the right portion of the circuit of FIG. 3, a positive DC power supply terminal 352 is connected to ground at 350. Negative DC power supply terminal 354 is connected to inductor 356 which is connected to resistor 358 which is connected to one side of variable capacitor 360. The other side of variable capacitor 260 is connected to a positive DC power supply terminal 362. A negative DC power supply terminal 364 is connected to ground at 366. Resistor 358 is also connected to capacitor 368 which is connected to load 400. In an alternate circuit configuration, the rotor electrode makes an electrical connection directly from the negative side of capacitor 260 to the positive side of capacitor 360, such that the rotor electrode has a virtual ground, and there are no power supplies connected at terminal 262 and 362.

Figure 4:
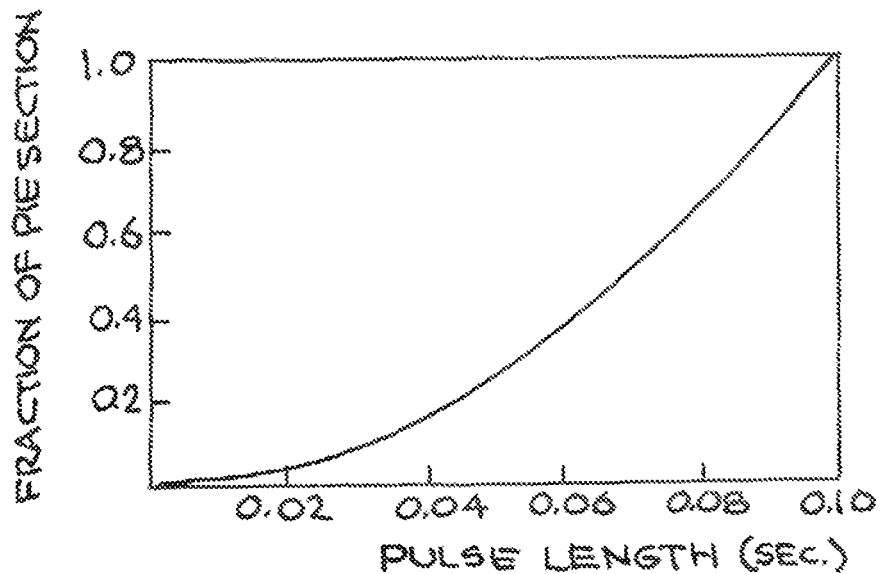
FIG. 4 is a plot of the fractional angular width of the rotor displacement relative to the angular width of an electrode.
Figure 5:
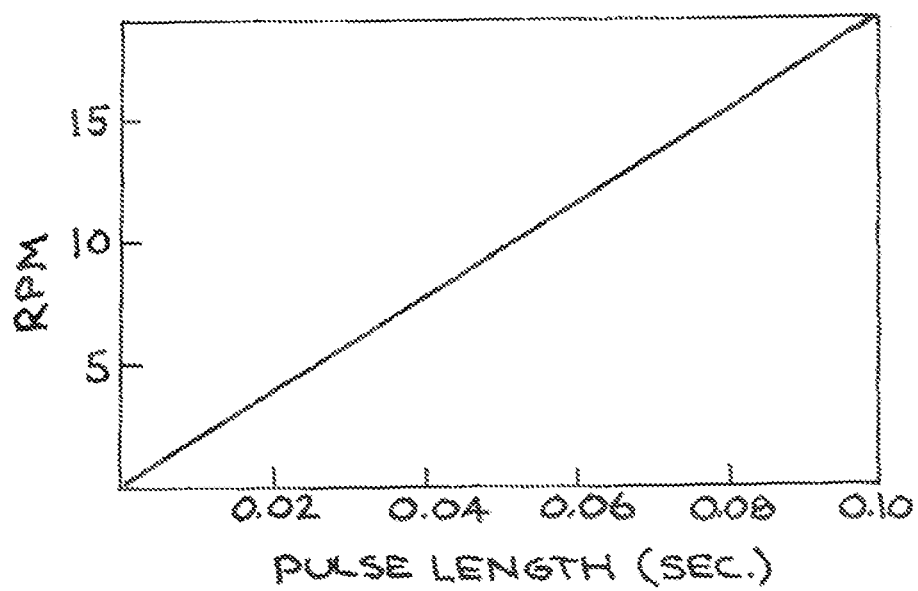
FIG. 5 is a plot of the calculated growth of rotation speed for the case plotted in FIG. 4.

A computer program has been written to model the launching action of the present invention, given the moment of inertia of the rotor, and the variation of capacity as a function of azimuthal angle of the E-S generator capacitor. An example case was run for a rotor with a diameter of 0.10 m and a length of 0.2 m. This example characterized an electrostatic generator stator and rotor having pie-slice-shaped electrodes located on the upper and lower surface of the rotor. See, e.g., FIGS. 4A and 4B of U.S. Pat. No. 7,834,513. The start-up pulse circuit delivered a 30 kV pulse for 0.1 seconds, at which time the rotor had rotated by an angle corresponding to the width of a single electrode. The pulse length was set so that it would not continue beyond the time when the capacity reached its maximum value. A longer pulse would result in deceleration of the rotor. FIG. 4 is a plot of the fractional angular width of the rotor displacement relative to the angular width of an electrode. Note that a lower voltage pulse with a longer pulse length could be used, as long as the torque produced was greater than the retention force of the magnetic locator. Also, it should be noted that the amount of pulse energy delivered during the startup as shown in FIG. 4 is small (0.02 Joules), thus simplifying the design of the pulser.

At the end of the start-up pulse, the rotor will have accelerated to art initial rpm. At this point, the main drive system can be turned on to further accelerate the rotor, up to its fully charged state.

Thus, an embodiment of a system for starting up an electrostatic generator/motor from rest in a predetermined direction has been described. The system consists of (1), a locating system employing a stationary permanent magnet pole acting on a ferromagnetic ring with a wave-like lower contour, and (2) a square-wave pulse generator that is connected to the terminals of the E-S generator motor during the start-up. No additional equipment is needed to launch the rotor, as would be the case if a motor drive or a solenoid-activated starter were to be employed for startup.

Based on the teachings herein, those skilled in the art will recognize that a wide variety of configurations are possible. For example, the ring may have a shape that is other than a wave and could be located at other places on the rotor. An alternate configuration has the ring affixed to a stationary structure with the magnet affixed to the rotor. As in the former case, the rotor will come to rest at the position where the gap between the ring and the magnet is a minimum. In a more complicated embodiment, a mechanism can be utilized to rotate the rotor to the correct position such that the startup pulse will cause the rotor to rotate in a desired direction.

The same system as described above may also be used as a rotation position sensor such as is needed when the EMB operates in its charging mode, i.e., when the E-S generator/motor pulsed drive system is being used.

As discussed above, in the LLNL electrostatic generator/ motor systems, the motor action function depends on a physics-based relationship between capacity value and the electrostatic forces on the elements that form the capacitor. Specifically, in a condenser made up of a periodic array of stator and rotor electrodes the capacity of which varies as a function of azimuthal position, when a potential is applied to the capacitor, the rotor will experience a force that pulls it in the direction in which the capacity value increases. This force goes to zero at the point of maximum capacity and then reverses in direction if the rotation continues. This means that in our E-S generator/motors the motoring function occurs only over those azimuthal positions where the capacity increases, and the generator action occurs over those azimuthal regions where the capacity is decreasing. Thus in operating in motor mode it is necessary to be able to sense the azimuthal position of the rotor with high accuracy so as to properly time the pulses from the drive system.

The invention described in the first part of this disclosure has the following major component: A magnet-based system that insures that the resting azimuthal position of the rotor is slightly clockwise or slightly counter-clockwise from any one of the multiple azimuthal positions of minimum capacity of the rotor.

As can be seen from the drawing and from the magnetics of the situation depicted, the magnetic flux within the magnet will be modulated by rotation of the wave-shaped iron ring. If, for example, the permanent magnet element material is the ceramic type of magnet material, this flux variation will not be subject to suppression by induced eddy currents so that if one wound a coil around the magnet, the variation in flux would create an ac voltage at the terminals of the coil. This signal could then be used to determine the angular position of the rotor relative to the positions of minimum capacity, as needed for synchronizing the pulses of the motor drive system with the rotation of the EMB rotor. Alternatively, a Hall-Effect solid-state magnetic field sensor could be used.

Thus, a system for determining the angular position of the rotor of an EMB that employs an electrostatic generator/ motor has been described. It employs the same system described above for starting up an electrostatic generator/ motor from rest in a predetermined direction. The only required new element in the system is an induction-based sensor system that detects the magnetic perturbations associated with the rotation of the wave-like iron ring that is mounted on the lower (or upper) surface of the rotor.

As discussed above, an embodiment of the invention is an general apparatus, comprising a rotor configured to rotate about a central axis; a first plurality of rod shaped electrodes fixedly attached to the rotor, wherein each rod thereof is parallel to all other rods thereof and to the central axis and has a first end and a second end, wherein each the first end is fixedly connected to a first support ring and each the second end is fixedly connected to a second support ring; a magnetic locating system comprising: a ferromagnetic strip configured as a ring and fixedly connected to the rotor and further having a wave-like edge extending away from the rotor; and a permanent magnet having a pole spaced from the wave-like edge such that when the rotor rotates, the gap between the pole and the wave-like edge varies; a first stator and a second stator, wherein the first stator has a second diameter and is centered on the central axis, wherein the second stator has a third diameter and is centered on the central axis, wherein the second diameter and the third diameter are equal, wherein the first diameter is different than both the second diameter and the third diameter; a second plurality of rod shaped electrodes fixedly attached to the first stator; a third plurality of rod shaped electrodes fixedly attached to the second stator, wherein the first plurality of rod shaped electrodes together with the second plurality of rod shaped electrodes form a first variable capacitor, wherein the first plurality of rod shaped electrodes together with the third plurality of rod shaped electrodes form a second variable capacitor; and a pulse drive circuit connected to the second plurality of rod shaped electrodes and the third plurality of rod shaped electrodes. The invention is not limited to the above described general embodiment. Based on the teachings herein, other general embodiments will be apparent to those skilled in the art.

The general apparatus may be more specifically limited, for example: wherein the rotor has a first diameter, wherein the rotor comprises a first support ring oriented in a first plane that is perpendicular to the central axis and further comprises a second support ring oriented in a second plane that is perpendicular to the central axis, wherein the first plane and the second plane are parallel one to another; wherein all of the rods of the first plurality of rod shaped electrodes are in electrical contact with each other rod of the first plurality of rods and wherein there is no direct electrical connection from any other element to the first plurality of rod shaped electrodes; wherein all of the rods of the second plurality of rod shaped electrodes are physically parallel one to another, are in electrical contact one to another, are oriented to be parallel with the central axis and are evenly spaced around the central axis, wherein the second stator comprises; and wherein all of the rods of the third plurality of rod shaped electrodes are physically parallel one to another, are in electrical contact one to another, are oriented to be parallel with the central axis and are evenly spaced around the central axis, wherein the first stator is spaced from the second stator on the central axis, wherein the rods of the first plurality of rod shaped electrodes are physically parallel to the rods of the second plurality of rod shaped electrodes and the third plurality of rod shaped electrodes, wherein the rotor is rotatable only on the outside of the first stator and the second stator, both of which are within the inner diameter of the rotor, wherein there is no direct physical or electrical contact between the rotor and the first stator and between the rotor and the second stator and may further include a series-resonant circuit comprising a source of positive voltage electrically connected through a first inductor to the first variable capacitor which is connected to the second variable capacitor which is connected through a second inductor to a source of negative voltage, wherein the first plurality of first rods rod shaped electrodes are at virtual ground and wherein the rotor is electrically isolated.

The general apparatus may be more specifically limited, for example: wherein when the pulse drive circuit is activated, it will generate an azimuthally directed force on the first plurality of electrodes (e.g., rod shaped electrodes), starting from the initial azimuthal position of the first plurality of rod shaped electrodes as determined by the magnetic locating system.

The general apparatus may be more specifically limited, for example: wherein the wave-like edge is positioned so that the pole can pull the first plurality of rod shaped electrodes around to a position where the position relative to the minimum capacity between the first plurality of rod shaped electrodes and both of the second plurality of rod shaped electrodes and the third plurality of rod shaped electrodes is such as to launch the rotor in a chosen direction, i.e., either clock-wise or counter-clockwise.

The general apparatus may be more specifically limited, for example: wherein the pulse drive circuit is configured to start the rotation of the rotor by applying a high-voltage ac or dc pulse to the second plurality of rod-shaped electrodes and to the third plurality of rod-shaped electrodes.

The general apparatus may be more specifically limited, for example: wherein the amplitude and duration of the pulse is set so that the pulse turns off as, due to the rotation velocity of the pulse, the first variable capacitor and the second variable capacitor approaches their maximum values, wherein at that time, the source of positive voltage and the source of negative are turned on in order to continue the growth in speed of the rotor.

The general apparatus may be more specifically limited, for example: wherein the magnetic locating system is configured to positioned the resting azimuthal position of the rotor to be slightly clockwise or slightly counter-clockwise from any one of the multiple azimuthal positions of minimum capacity of the first variable capacitor and the second variable capacitor.

The general apparatus may be more specifically limited, for example: wherein the ferromagnetic strip is fixedly attached to the inner radius of the rotor structure.

The general apparatus may be more specifically limited, for example: wherein the wave-like edge comprises a minima having a depth configured to achieve a desired value of locating force.

The general apparatus may be more specifically limited, for example: wherein the pulse drive circuit is configured to produce a square wave.

The general apparatus may be more specifically limited, for example: wherein the magnet comprises ceramic type magnet material and is wrapped with a coil.

The invention is not limited to the above described specific embodiments. Based on the teachings herein, other specific embodiments will be apparent to those skilled in the art.

Further, an embodiment of the invention is a general method of operating the general apparatus including the steps of positioning, by utilizing the pole, the first plurality of rod shaped electrodes around to a position where the position relative to the minimum capacity between the first plurality of rod shaped electrodes and both of the second plurality of rod shaped electrodes and the third plurality of rod shaped electrodes is such as to launch the rotor in a chosen direction (clock-wise or counter-clockwise) upon applying a high-voltage ac or dc pulse from the pulse drive circuit to the second plurality of rod shaped electrodes and to the third plurality of rod shaped electrodes; and starting the rotor to rotate by applying a high-voltage ac or dc pulse to the second plurality of rod shaped electrodes and to the third plurality of rod shaped electrodes. The invention is not limited to the above described general method. Based on the teachings herein, other general embodiments of the method will be apparent to those skilled in the art.

The steps of general method may be more specifically limited, for example: wherein the rotor has a first diameter, wherein the rotor comprises a first support ring oriented in a first plane that is perpendicular to the central axis and further comprises a second support ring oriented in a second plane that is perpendicular to the central axis, wherein the first plane and the second plane are parallel one to another; wherein all of the rods of the first plurality of rod shaped electrodes are in electrical contact with each other rod of the first plurality of rods and wherein there is no direct electrical connection from any other element to the first plurality of rod shaped electrodes; wherein all of the rods of the second plurality of rod shaped electrodes are physically parallel one to another, are in electrical contact one to another, are oriented to be parallel with the central axis and are evenly spaced around the central axis, wherein the second stator comprises; and wherein all of the rods of the third plurality of rod shaped electrodes are physically parallel one to another, are in electrical contact one to another, are oriented to be parallel with the central axis and are evenly spaced around the central axis, wherein the first stator is spaced from the second stator on the central axis, wherein the rods of the first plurality of rod shaped electrodes are physically parallel to the rods of the second plurality of rod shaped electrodes and the third plurality of rod shaped electrodes, wherein the rotor is rotatable only on the outside of the first stator and the second stator, both of which are within the inner diameter of the rotor, wherein there is no direct physical or electrical contact between the rotor and the first stator and between the rotor and the second stator.

The steps of general method may be more specifically limited, for example: wherein the apparatus further comprises a series-resonant circuit comprising a source of positive voltage electrically connected through a first inductor to the first variable capacitor which is connected to the second variable capacitor which is connected through a second inductor to a source of negative voltage, wherein the first plurality of first rods rod shaped electrodes are at virtual ground and wherein the rotor is electrically isolated.

The steps of general method may be more specifically limited, for example: wherein the high-voltage ac or dc pulse generates an azimuthally directed force on the first plurality of rod-shaped electrodes, further comprising the step of starting from the initial azimuthal position of the first plurality of rod-shaped electrodes as determined by the magnetic locating system.

The steps of general method may be more specifically limited, for example by further comprising the step of turning off the amplitude and duration of the pulse as, due to the rotation velocity of the pulse, the first variable capacitor and the second variable capacitor approach their maximum values and turning on the source of positive voltage and the source of negative in order to continue the growth in speed of the rotor.

The steps of general method may be more specifically limited, for example by further comprising the step of utilizing the magnetic locating system to position the resting azimuthal position of the rotor to be slightly clockwise or slightly counter-clockwise from any one of the multiple azimuthal positions of minimum capacity of the first variable capacitor and the second variable capacitor.

The steps of general method may be more specifically limited, for example: wherein the pulse is a square wave.

The steps of general method may be more specifically limited, for example: wherein the magnet comprises ceramic type magnet material and is wrapped with a coil, the method further comprising detecting the magnetic perturbations in the coil, which perturbations are associated with the rotation of the wave-like iron ring relative to the coil.

The invention is not limited to the above described specific embodiments. Based on the teachings herein, other specific embodiments will be apparent to those skilled in the art.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a rotor configured to rotate about a central axis;
a first plurality of electrodes fixedly attached to said rotor;
a magnetic locating system comprising:
  a ferromagnetic strip fixedly connected to said rotor and having a wave-like edge extending away from said rotor; and
  a permanent magnet having a pole spaced from said wave-like edge such that when said rotor rotates, the gap between said pole and said wave-like edge varies;
a stator centered on said central axis;
a second plurality of electrodes fixedly attached to said stator; and
a pulse drive circuit connected to said second plurality of electrodes, wherein said wave-like edge is positioned so that said pole can pull said first plurality of electrodes around to a position where the position relative to the minimum capacity between said first plurality of electrodes and said second plurality of electrodes is such as to launch said rotor in a chosen direction.

2. The apparatus of claim 1, wherein when said pulse drive circuit is activated, it will generate an azimuthally directed force on said first plurality of electrodes, starting from the initial azimuthal position of said first plurality of electrodes as determined by said magnetic locating system.

3. The apparatus of claim 1, wherein said pulse drive circuit is configured to start the rotation of said rotor by applying a high-voltage ac or dc pulse to said second plurality of electrodes.

4. The apparatus of claim 1, wherein said first plurality of electrodes together with said second plurality of electrodes form a first variable capacitor and wherein said magnetic locating system is configured to position the resting azimuthal position of said rotor to be slightly clockwise or slightly counter-clockwise from any one of the multiple azimuthal positions of minimum capacity of said first variable capacitor.

5. The apparatus of claim 1, wherein said ferromagnetic strip is fixedly attached to the inner radius of said rotor structure.

6. The apparatus of claim 1, wherein said wave-like edge comprises a minima having a depth configured to achieve, a desired value of locating force.

7. The apparatus of claim 1, wherein said pulse drive circuit is configured to produce a square wave.

8. The apparatus of claim 1, wherein said magnet comprises ceramic type magnet material and is wrapped with a coil.

* * * * *